Patented Mar. 4, 1952

2,588,095

UNITED STATES PATENT OFFICE 2,588,095

LEAD CABLE SHEATH ALLOY

John F. Eckel, Schenectady, N. Y., assignor to General Electric Company, a corporation of New York No Drawing. Application December 24, 1949, Serial No. 135,041

6 Claims. (Cl. 75—166)

The present invention relates to lead base alloys particularly suitable for use as a cable sheath and to cables sheathed with such an alloy.

In fluid-filled cables, such as the gas-filled and oil-filled cables, of the lead sheath type, creep resistance as a factor in bursting strength is one of the more important factors in the selection of the sheathing material. The reason for this is that such cables ordinarily operate under internal fluid pressure. Also in the case of the oil-filled cables the oil can flow to some extent and when a section of an oil-filled cable is run at an angle to the horizontal, the hydrostatic head of oil in the lower part of the cable may be sufficient to swell and eventually burst the sheath causing cable failure. Another important factor in the selection of lead sheathing alloys for fluid-filled cables as well as other lead sheathed cables is good bending life or bending fatigue strength such that the sheath will be capable of withstanding repeated and substantial bending resulting, for example, from changes in temperature or from vibration.

Both as to creep resistance and bending life, pure or commercial lead is not satisfactory for such sheathing applications. Certain lead alloys as, for example, those containing small amounts of arsenic and bismuth or arsenic, bismuth and tin have been found to be generally superior to the pure lead as cable sheathing and have been used considerably in cable manufacture.

Cables are used under all kinds of operating conditions including those under which little or no provisions are made for the dissipation of heat or where relatively sharp bends in the cable are subjected to substantial changes in temperature or increases in internal pressure. In addition, cable users frequently desire or are forced to subject the cables to higher electrical loads which again means higher average operating temperatures. As a result, even though considerable progress has been made in improving cable sheath alloys, there is a continued demand for better sheathing materials and more particularly for a sheathing alloy having a longer service life at the more elevated temperatures.

The present invention is based on the discovery that further improvement in cable sheathing can be obtained by employing certain novel lead alloys essentially containing small amounts of tellurium, arsenic and tin. More specifically, it has been found that alloys containing by weight 0.01 to 0.4% tellurium
0.05 to 0.5% arsenic
0.05 to 1.0% tin balance lead, are particularly useful as cable sheathing. The term "balance lead" is intended to cover lead containing small amounts of impurities such as antimony, copper, bismuth, zinc, silver and iron present in commercial leads, the presence of which, in impurity amounts, is not detrimental to the present invention. Preferred alloys are those containing 0.05 to 0.2% tellurium, 0.15 to 0.3% arsenic, 0.05 to 0.2% tin and particularly 0.10 to 0.15% tellurium, 0.20 to 0.25% arsenic, 0.10 to 0.15% tin, balance substantially lead.

The cable sheathing alloys of the present invention are particularly characterized by good creep resistance at higher operating temperatures and good bending life under higher strain conditions so that the cable sheaths of the subject alloys are characterized by improved service life, particularly at the more elevated operating temperatures.

The advantageous properties of the alloys of the present invention with regards to bending life are evident from the test results on a series of alloys, the composition of which is set forth in Table I.

TABLE I

Composition of various cable sheath alloys

| Alloy | Per Cent Te | Per Cent As | Per Cent Sn | Per Cent Bi | Per Cent Cu |
|---|---|---|---|---|---|
| SJ286 | | | | | 0.06 |
| A378 | 0.07 | 0.27 | 0.13 | | |
| A295 | 0.064 | 0.20 | 0.155 | | |
| J298 | 0.076 | 0.20 | 0.14 | | 0.074 |
| GE1340 | | 0.13 | 0.10 | 0.08 | |
| GE1329 | | 0.17 | 0.135 | 0.024 | 0.067 |
| C-389 [1] | | 0.182 | 0.084 | 0.097 | |
| C-417 [1] | | 0.16 | 0.113 | 0.012 | 0.06 |

NOTE.—Only major alloying and impurity elements are shown, the balance in each case is substantially all lead with usual impurities.

[1] These analyses and values listed in subsequent tables for these alloys were taken from Bulletin 378 of the Engineering Experiment Station, University of Illinois.

Results of repeated bending tests under varying strain conditions run at 110° F. and 1 cycle per minute on strip samples of various lead alloys show that, in general, the bending life of the arsenical alloys is longer than that of copper lead. However, the arsenical alloys are more sensitive to the amount of strain imposed per cycle. At low strain values, below 0.3% per cycle, all of the arsenical alloys show a very long bending life. However, it is in the higher strain ranges of at least 0.3%, 0.4% or 0.5% strain per cycle that the superiority of the lead-tellurium-arsenic-tin alloy (A378) is clearly demonstrated in Table II.

TABLE II

*Comparison of bending life of several cable sheath alloys as determined by repeated bending tests at 110° F. and 1 cycle per minute*

| Alloy | 0.3% Strain | Cycles to Failure 0.4% Strain | 0.5% Strain |
|---|---|---|---|
| SJ286 | 9,300 | 7,990 | 7,200 |
| A378 | 33,500 | 26,980 | 22,180 |
| GE1340 | 20,700 | 16,300 | 12,700 |
| GE1329 | 28,000 | 16,600 | 9,300 |
| C-389 | 26,644 | 17,402 | 9,367 |
| C-417 | 17,494 | 8,800 | 9,451 |

Creep properties of the copper-free arsenical type (C-389), the copper-bearing arsenical type (C-417), and two lead-tellurium-arsenic-tin alloys (A295 and J298) are shown in Table III. Alloys A295 and J298 differ in that A295 was made using corroding lead as the base whereas J298 was made using chemical lead as the base. Hence the essential difference between the two is the presence of copper in J298 as indicated in Table I.

The results set forth in Table III were obtained by subjecting strips of the designated alloys to the indicated stresses and at the indicated temperatures and periodically noting the elongation or total creep under the test conditions.

TABLE III

*Creep test results*

| Alloy | Temp. °F | Stress p.s.i. | Total Creep percent 2,000 Hr. | 5,000 Hr. | 10,000 Hr. |
|---|---|---|---|---|---|
| C-389 | (4) | 300 | 0.0675 | 0.074 | |
|  |  | 200 | 0.031 | 0.030 | |
| C-389 | 110 | 300 | 0.079 | 0.121 | 0.168 |
|  |  | 200 | 0.032 | 0.044 | 0.060 |
| C-389 | 150 | 300 | 0.60 | 0.126 | 2.58 |
|  |  | 200 | 0.11 | 0.19 | 0.28 |
| C-417 | 78 | 300 | 0.116 | 0.145 | |
|  |  | 200 | 0.048 | 0.060 | |
| C-417 | 110 | 300 | 0.345 | 0.645 | |
|  |  | 200 | 0.060 | 0.090 | |
| C-417 | 150 | 300 | 0.585 | 1.680 | |
|  |  | 200 | 0.109 | 0.196 | |
| A295[1] | 86 | 500 | 0.270 | 0.675 | 1.485 |
|  |  | 200 | 0.027 | 0.032 | 0.037 |
| A295Q[2] | 86 | 500 | 0.256 | 0.615 | 1.245 |
|  |  | 200 | 0.026 | 0.027 | 0.036 |
| A295QQ[3] | 86 | 500 | 0.012 | 0.016 | 0.016 |
|  |  | 200 | 0.007 | 0.007 | 0.007 |
| J298[1] | 86 | 500 | 0.137 | 0.360 | 1.135 |
|  |  | 200 | 0.015 | 0.020 | 0.030 |
| J298Q[2] | 86 | 500 | 0.104 | 0.250 | 0.496 |
|  |  | 200 | 0.007 | 0.012 | 0.017 |
| J298QQ[3] | 86 | 500 | 0.017 | 0.017 | 0.024 |
|  |  | 200 | 0.012 | 0.012 | 0.016 |
| A295QQ[3] | 78 | 500 | 0.026 | | |
| A295QQ[3] | 110 | 300 | 0.018 | | |
|  |  | 200 | 0.015 | | |
| A295QQ[3] | 150 | 300 | 0.019 | | |
|  |  | 200 | 0.008 | | |
| GE1340 | 110 | 200 | [5] 0.065 | | |
|  | 110 | 300 | [5] 0.14 | | |
|  | 150 | 300 | [5] 0.86 | | |

[1] Air cooled after extrusion.
[2] Air cooled after extrusion, reheated 4 hours at 240°C (464°F) and quenched.
[3] Air cooled after extrusion reheated 4 hours at 270°C (518°F) and quenched.
[4] Room (78).
[5] At 1500 hr.

From the above table, a direct comparison of all of the alloys can best be made at a stress of 200 p. s. i. and at temperatures of 78° or 86° F. Such comparison shows that the alloys of the present invention possess better creep properties than any of the other alloys tested and that further improvements can be obtained by the indicated heat treatments. For instance, the total creep for the C-389 alloy with a stress of 200 p. s. i. at 78° F. was 0.030% after 5000 hours and for the copper-bearing arsenical type (C-417) 0.060%, while the same stress applied 5000 hours but at 86° F. produced a total creep of only 0.032% in an air cooled sample of A295. An air cooled sample of J298 showed even better creep resistance. After 5000 hours with a stress of 200 p. s. i. at 86° F., the total creep was only 0.020%.

The creep resistance of the lead-tellurium-arsenic-tin alloys can be materially increased by thermal treatment. This is clearly shown by comparing the total creep obtained on A295 after various treatments. For instance in a sample of A295 that was air cooled after extrusion, a total creep of 1.485% was observed after it had been subjected to a stress of 500 p. s. i. at 86° F. for 10,000 hours. Under the same conditions of test, the total creep observed in a sample of the same alloy quenched from 240° C. (464° F.) was 1.245% and in a sample quenched from 270° C. (518° F.), the total creep was only 0.016%. Similar results were obtained by subjecting alloy J298 (copper-bearing) to the same thermal treatment.

The lead-tellurium-arsenic-tin alloys have also shown superior resistance to creep at higher temperatures. Creep values obtained from a stress of 200 p. s. i. applied to lead and lead alloys at 110° F. are generally employed in cable design. Under these conditions of test, the heat treated sample of alloy A295 has proved to be superior to the C-389 and also superior to the copper-bearing arsenical type (C-417). Since cable users are looking toward higher electrical loads and hence higher average operating temperatures, the results of tests on A295 at 150° F. indicate that the lead-tellurium-arsenic-tin alloys can be satisfactorily employed at this higher temperature. The better creep properties of these alloys may also permit the design of cables for higher pressures as well as higher operating temperatures.

Tests have indicated that to obtain the maximum bending life, the impurity content of the lead alloy should be kept as low as possible. However, while best results have been obtained by employing a corroding lead of high purity (99.995% Pb) in making the alloys, excellent alloys have also been obtained using other commercial grades of lead containing their usual impurities. Examples of such leads are common desilverized lead A and chemical lead which respectively introduce up to about 0.15% bismuth or 0.04 to 0.08% copper and up to 0.020% silver into the finished alloys. Other commercial leads can also be used and the invention therefore includes all alloys obtained by the addition of the designated quantities of tellurium, arsenic and tin to such commercial leads.

From the above description, it will be seen that there has been provided an improved lead alloy for sheathing all cables of the lead-sheathed type. Its application to fluid-filled cables and particularly gas-filled cables may permit the higher fluid, e. g., gas, pressures and a corresponding reduction in insulation thickness and cable diameter and cost. The high creep strength and good bending life of the alloy is also an advantage in the solid type cables in permitting higher load temperatures and resisting internal pressures built up by load expansion and compound migration on slopes and vertical risers.

What I claim as new and desire to secure by Letters Patent of the United States is:

1. A lead base alloy comprising 0.01 to 0.4% tellurium, 0.05 to 0.5% arsenic, 0.05 to 1.0% tin, balance lead and the small amounts of impurities present in commercial leads.

2. A lead base alloy comprising 0.05 to 0.2% tellurium, 0.15 to 0.3% arsenic, 0.05 to 0.2% tin, balance lead and the small amounts of impurities present in commercial leads.

3. A lead base alloy comprising 0.10 to 0.15% tellurium, 0.20 to 0.25% arsenic, 0.10 to 0.15% tin, balance lead and the small amounts of impurities present in commercial leads.

4. A lead-sheathed cable having a sheath formed of an alloy comprising 0.01 to 0.4% tellurium, 0.05 to 0.5% arsenic, 0.05 to 1.0% tin, balance lead and the small amounts of impurities present in commercial leads.

5. A lead-sheathed cable having a sheath formed of an alloy comprising 0.05 to 0.2% tellurium, 0.15 to 0.3% arsenic, 0.05 to 0.2% tin, balance lead and the small amounts of impurities present in commercial leads.

6. A lead-sheathed cable having a sheath formed of an alloy comprising 0.10 to 0.15% tellurium, 0.20 to 0.25% arsenic, 0.10 to 0.15% tin, balance lead and the small amounts of impurities present in commercial leads.

JOHN F. ECKEL.

REFERENCES CITED

The following references are of record in the file of this patent:

UNITED STATES PATENTS

| Number | Name | Date |
|---|---|---|
| 1,722,358 | Seljaesaeter | July 30, 1929 |
| 2,060,534 | Singleton et al. | Nov. 10, 1936 |
| 2,148,741 | Gonser | Feb. 28, 1939 |
| 2,375,755 | Bassett, Jr., et al. | May 15, 1945 |

FOREIGN PATENTS

| Number | Country | Date |
|---|---|---|
| 568,073 | Great Britain | Mar. 16, 1945 |
| 585,160 | Great Britain | Jan. 31, 1947 |